US009078051B2

(12) United States Patent
Ruiz et al.

(10) Patent No.: US 9,078,051 B2
(45) Date of Patent: Jul. 7, 2015

(54) INTELLIGENT PATCHING SYSTEMS AND COMPONENTS THEREOF

(71) Applicant: CommScope, Inc. of North Carolina, Hickory, NC (US)

(72) Inventors: Guilibaldo Ruiz, McKinney, TX (US); Patrick Fariello, Murphy, TX (US)

(73) Assignee: CommScope, Inc. of North Carolina, Hickory, NC (US)

( * ) Notice: Subject to any disclaimer, the term of this patent is extended or adjusted under 35 U.S.C. 154(b) by 150 days.

(21) Appl. No.: 13/769,589

(22) Filed: Feb. 18, 2013

(65) Prior Publication Data

US 2014/0233902 A1 Aug. 21, 2014

(51) Int. Cl.
| | |
|---|---|
| *H01R 3/00* | (2006.01) |
| *G02B 6/00* | (2006.01) |
| *G02B 6/38* | (2006.01) |
| *G02B 6/36* | (2006.01) |
| *H04Q 1/02* | (2006.01) |
| *H01R 13/641* | (2006.01) |

(52) U.S. Cl.
CPC ................. *H04Q 1/136* (2013.01); *H04Q 1/13* (2013.01); *G02B 6/3895* (2013.01); *H01R 13/641* (2013.01)

(58) Field of Classification Search
CPC .. G02B 6/4452; G02B 6/3897; G02B 6/4455; G02B 6/4292; G02B 6/3895; H01R 13/641; H04Q 1/13
USPC ............ 385/75, 135, 139, 88, 89, 92; 439/49, 439/488–490; 340/548, 568.1–568.4, 653, 340/687
See application file for complete search history.

(56) References Cited

U.S. PATENT DOCUMENTS

| | | | | |
|---|---|---|---|---|
| 6,688,910 | B1 * | 2/2004 | Macauley | 439/491 |
| 2007/0117444 | A1 * | 5/2007 | Caveney et al. | 439/404 |
| 2009/0053923 | A1 * | 2/2009 | Navarro et al. | 439/489 |
| 2010/0109892 | A1 | 5/2010 | Fariello et al. | |

* cited by examiner

*Primary Examiner* — Kaveh Kianni
*Assistant Examiner* — Hung Lam
(74) *Attorney, Agent, or Firm* — Myers Bigel Sibley & Sajovec, P.A.

(57) ABSTRACT

A kit for providing intelligence capability to a communications frame includes: a housing having a central portion, pairs of upper members extending from opposite sides of the central portion, and a plurality of fingers extending away from each of the upper members; a rear cover attached to the housing, the cover having a central body, pairs of upper legs extending from opposite sides of the central body, and a plurality of fingers extending away from each of the upper members; and a PCB having a central section, pairs of upper members extending from opposite sides of the central section, and a plurality of fingers extending away from each of the upper members, the PCB being adapted for attachment to the housing and rear cover, with the central section being sandwiched between the central portion and the central body, the PCB upper members being sandwiched between the rear cover upper members and the housing upper members, and the PCB fingers being sandwiched between the rear cover fingers and the housing fingers. The PCB further comprises electronic circuitry configured to detect the presence or absence of a connector positioned between adjacent PCB fingers.

18 Claims, 6 Drawing Sheets

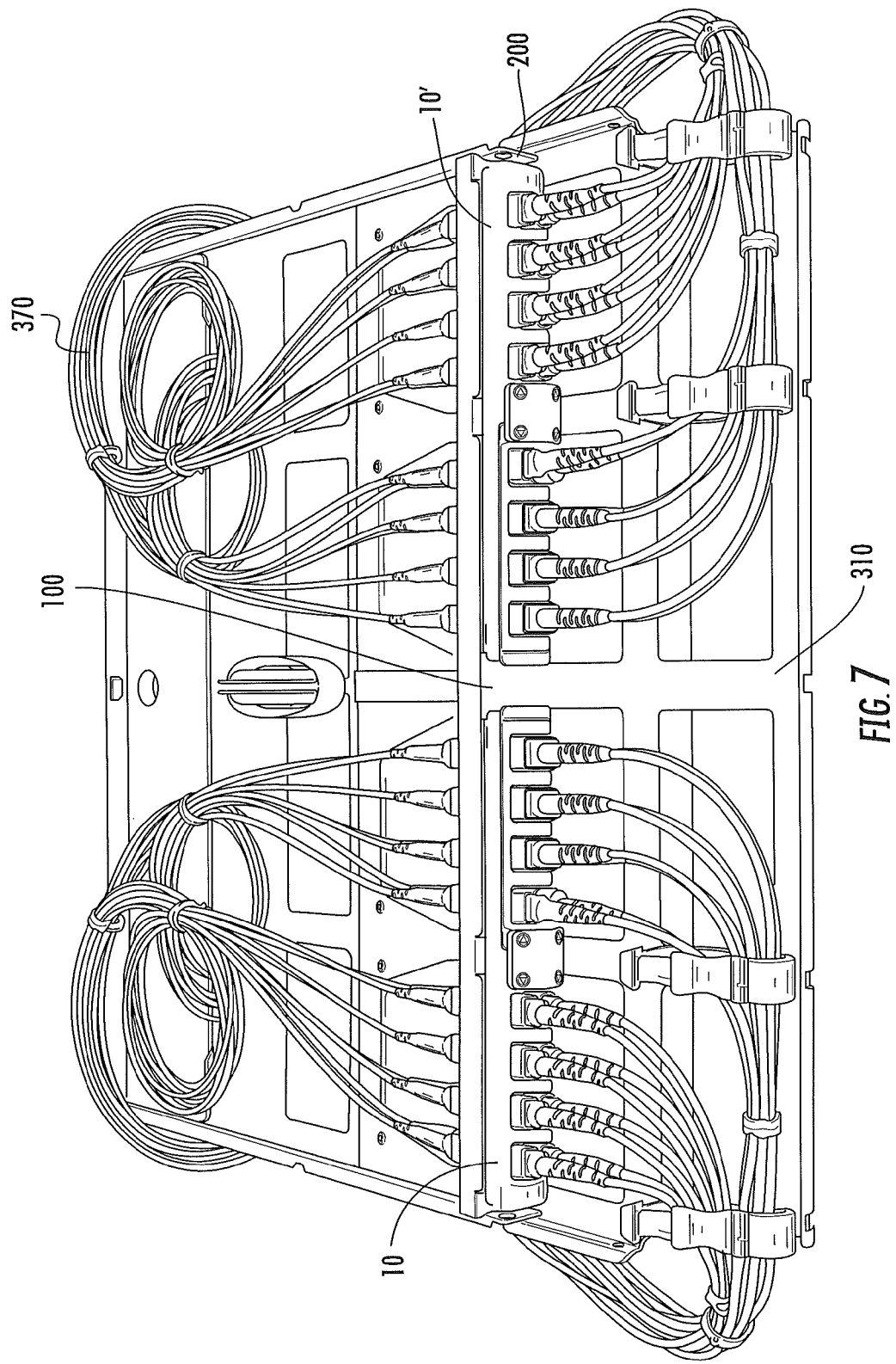

INTELLIGENT PATCHING SYSTEMS AND COMPONENTS THEREOF

FIELD OF THE INVENTION

The present invention relates generally to communications systems and, more particularly, to automatically tracking cabling connections in communications systems.

BACKGROUND

Most businesses, government agencies, schools and other organizations employ dedicated communications systems (also referred to herein as "networks") that enable computers, servers, printers, facsimile machines, telephones, security cameras and the like to communicate with each other, through a private network, and with remote locations via a telecommunications service provider. Such communications system may be hard-wired through, for example, the walls and/or ceilings of a building using communications cables and connectors. Individual communications connectors (which are also referred to herein as "connector ports") are mounted in offices, conference rooms and other work areas throughout the building. The communications cables and any intervening connectors provide communications paths from the connector ports (e.g., modular wall jacks) in offices and other rooms, hallways and common areas of the building (referred to herein as "work area outlets") to network equipment (e.g., network switches, servers, memory storage devices, etc.) that may be located in a computer room, telecommunications closet or the like. Communications cables from external telecommunication service providers may also terminate within the computer room or telecommunications closet.

A commercial data center is a facility that may be used to run the computer-based applications that handle the core electronic business and operational data of one or more organizations. The expansion of the Internet has also led to a growing need for so-called "Internet data centers," which are data centers that are used by online retailers, Internet portals, search engine companies and the like to provide large numbers of users simultaneous, secure, high-speed, fail-safe access to their web sites. Both types of data centers may host hundreds, thousands or even tens of thousands of servers, routers, memory storage systems and other associated equipment. In these data centers, fiber optic communications cables and/or communications cables that include four differential pairs of insulated conductive (e.g., copper) wires are typically used to provide a hard-wired communications system that interconnects the data center equipment.

In both office network and data center communications systems, the communications cables that are connected to end devices (e.g., network servers, memory storage devices, network switches, work area computers, printers, facsimile machines, telephones, etc.) may terminate into one or more communications patching systems that may simplify later connectivity changes. Typically, a communications patching system includes one or more "patch panels" that are mounted on equipment rack(s) or in cabinet(s), and a plurality of "patch cords" that are used to make interconnections between different pieces of equipment. As is known to those of skill in the art, a "patch cord" refers to a communications cable (e.g., a cable that includes four differential pairs of copper wires or a fiber optic cable) that has a connector such as, for example, an RJ-45 plug or a fiber optic connector, on at least one end thereof. A "patch panel" refers to an inter-connection device that includes a plurality (e.g., 24 or 48) of connector ports. Each connector port (e.g., an RJ-45 jack or a fiber optic adapter) on a patch panel may have a plug aperture on a front side thereof that is configured to receive the connector of a patch cord (e.g., an RJ-45 plug or MPO plug), and the back end of each connector port may be configured to receive a communications cable. The patching system may optionally include a variety of additional equipment such as rack managers, system managers and other devices that facilitate making and/or tracking patching connections.

In a typical office network, "horizontal" cables are used to connect each work area outlet to the back end of a respective connector port on a first set of patch panels. The first end of each of these horizontal cables is terminated into the connector port of a respective one of the work area outlets, and the second end of each of these horizontal cables is terminated into a respective one of the connector ports on the patch panel. In an "inter-connect" patching system, a single set of patch cords is used to directly connect the connector ports on a first set of patch panels to respective connector ports on network switches. In a "cross-connect" patching system, a second set of patch panels is provided, and the first set of patch cords is used to connect the connector ports on the first set of patch panels to respective connector ports on the second set of patch panels, and the second set of typically single-ended patch cords is used to connect the connector ports on the second set of patch panels to respective connector ports on the network switches. In both inter-connect and cross-connect patching systems the cascaded set of plugs, jacks and cable segments that connect a connector port on a network switch to a work area end device is typically referred to as a channel.

The connections between the work area end devices and the network switches may need to be changed for a variety of reasons, including equipment changes, adding or deleting users, office moves, etc. In an inter-connect patching system, these connections are typically changed by rearranging the patch cords in the set of patch cords that run between the first set of patch panels and the network switches. In a cross-connect patching system, the connections between the work area end devices and the network switches are typically changed by rearranging the patch cords in the set of patch cords that run between the first set of patch panels and the second set of patch panels. Both types of patching systems allow a network manager to easily implement connectivity changes by simply unplugging one end of a patch cord from a first connector port on one of the patch panels in the first set of patch panels and then plugging that end of the patch cord into a second connector port on one of the patch panels in the first set of patch panels. In data centers, horizontal cables may be routed between patching fields, and similar connection changes are also routinely required in data center environments.

The connectivity between the connector ports on the network switches and the work area outlets is typically recorded in a computer-based log. Each time patching changes are made, this computer-based log is updated to reflect the new patching connections. Unfortunately, in practice technicians may neglect to update the log each and every time a change is made, and/or may make errors in logging changes. As such, the logs may not be complete and/or accurate.

In order to reduce or eliminate such logging errors, a variety of systems have been proposed that automatically log the patch cord connections in a communications patching system. These automated patching systems typically use special "intelligent" patch panels that employ sensors, radio frequency identification tags, serial ID chips and the like and/or special patch cords that include an additional conductor to detect patch cord insertions and removals and/or to automatically track patching connections. Typically, these systems require that all of the patch panels in the patching system have these automatic tracking capabilities and, in inter-connect systems, may also require that the network switches include automatic tracking capabilities as well. An exemplary intelligent patching system is described in U.S. Patent Publication No. 2010/0109892, the disclosure of which is hereby incorporated herein by reference in its entirety.

It may be desirable to provide components and/or kits that enable existing patch panels, whether outfitted as intelligent patch panels or not, to be upgraded to subsequent versions of intelligent patch panels.

SUMMARY

As a first aspect, embodiments of the present invention are directed to a kit for providing intelligence capability to a communications frame. The kit comprises: a housing having a central portion, a pair of upper members extending from opposite sides of the central portion, and a plurality of fingers extending away from each of the upper members; a rear cover attached to the housing, the cover having a central body, a pair of upper members extending from opposite sides of the central body, and a plurality of fingers extending away from each of the upper members; and a PCB having a central section, a pair of upper members extending from opposite sides of the central section, and a plurality of fingers extending away from each of the upper members, the PCB being adapted for attachment to the housing and rear cover, with the central section being sandwiched between the central portion and the central body, the PCB upper members being sandwiched between the rear cover upper members and the housing upper members, and the PCB fingers being sandwiched between the rear cover fingers and the housing fingers. The PCB further comprises electronic circuitry configured to detect the presence or absence of a connector positioned between adjacent PCB fingers.

As a second aspect, embodiments of the present invention are directed to a communications assembly, comprising: a communications frame; and an intelligent patching assembly mounted to the communications frame. The intelligent patching assembly comprises: a housing having a central portion, a pair of upper members extending from opposite sides of the central portion, and a plurality of fingers extending away from each of the upper members; a rear cover attached to the housing, the cover having a central body, a pairs of upper members extending from opposite sides of the central body, and a plurality of fingers extending away from each of the upper members; and a PCB having a central section, a pair of upper members extending from opposite sides of the central section, and a plurality of fingers extending away from each of the upper members, the PCB being adapted for attachment to the housing and rear cover, with the central section being sandwiched between the central portion and the central body, the PCB upper members being sandwiched between the rear cover upper members and the housing upper members, and the PCB fingers being sandwiched between the rear cover fingers and the housing fingers. The PCB further comprises electronic circuitry configured to detect the presence or absence of a connector positioned between adjacent PCB fingers.

As a third aspect, embodiments of the present invention are directed to a kit for providing intelligence capability to a communications frame, comprising: a housing having a central portion and a pair of members extending from opposite sides of the central portion; a cover attached to the housing, the cover having a central body and a pair of members extending from opposite sides of the central body; and a PCB having a central section and a pair of members extending from opposite sides of the central section, the PCB being adapted for attachment to the housing and cover, with the central section being sandwiched between the central portion and the central body, and the PCB members being sandwiched between the cover members and the housing members. The PCB comprises electronic circuitry configured to detect the presence or absence of a connector positioned between adjacent PCB members, and further comprises indicator lights on each of pair of members that indicate a particular connector port between PCB members. One of the cover and the housing includes a central keypad, the keypad configured to illuminate any of the indicator lights designated for particular connector ports.

BRIEF DESCRIPTION OF THE FIGURES

FIG. 7 is a top perspective view of a shelf on which the patch panel of FIGS. 5 and 6 and the kit of FIG. 1 are mounted.

DETAILED DESCRIPTION OF EMBODIMENTS OF THE INVENTION

The present invention will be described with reference to the accompanying drawings, in which certain embodiments of the invention are shown. This invention may, however, be embodied in many different forms and should not be construed as limited to the embodiments that are pictured and described herein; rather, these embodiments are provided so that this disclosure will be thorough and complete, and will fully convey the scope of the invention to those skilled in the art. It will also be appreciated that the embodiments disclosed above can be combined in any way and/or combination to provide many additional embodiments.

Unless otherwise defined, all technical and scientific terms that are used in this disclosure have the same meaning as commonly understood by one of ordinary skill in the art to which this invention belongs. The terminology used in the above description is for the purpose of describing particular embodiments only and is not intended to be limiting of the invention. As used in this disclosure, the singular forms "a", "an" and "the" are intended to include the plural forms as well, unless the context clearly indicates otherwise. It will also be understood that when an element (e.g., a device, circuit, etc.) is referred to as being "connected", "attached", "coupled" or the like to another element, it can be directly connected or coupled to the other element or intervening elements may be present. In contrast, when an element is referred to as being "directly connected" or "directly coupled" to another element, there are no intervening elements present.

It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein the expression "and/or" includes any and all combinations of one or more of the associated listed items. In addition, spatially relative terms, such as "under", "below", "lower", "over", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "under" or "beneath" other elements or features would then be oriented "over" the other elements or features. Thus, the exemplary term "under" can encompass both an orientation of over and under. The device may be otherwise oriented (rotated 90 degrees or at other orientations) and the spatially relative descriptors used herein interpreted accordingly.

Figure 1:
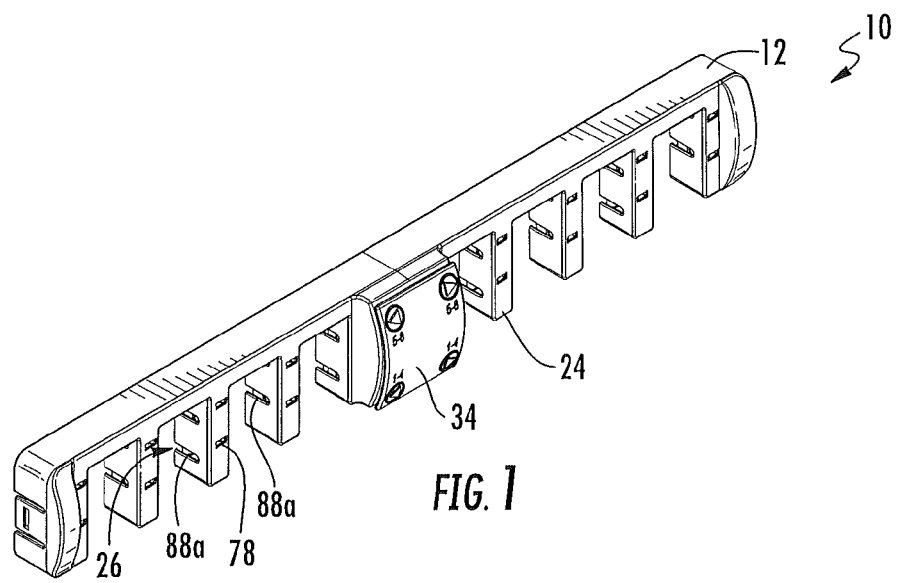
FIG. 1 is an assembled front perspective view of an intelligent patch panel kit according to embodiments of the present invention.
Figure 2:
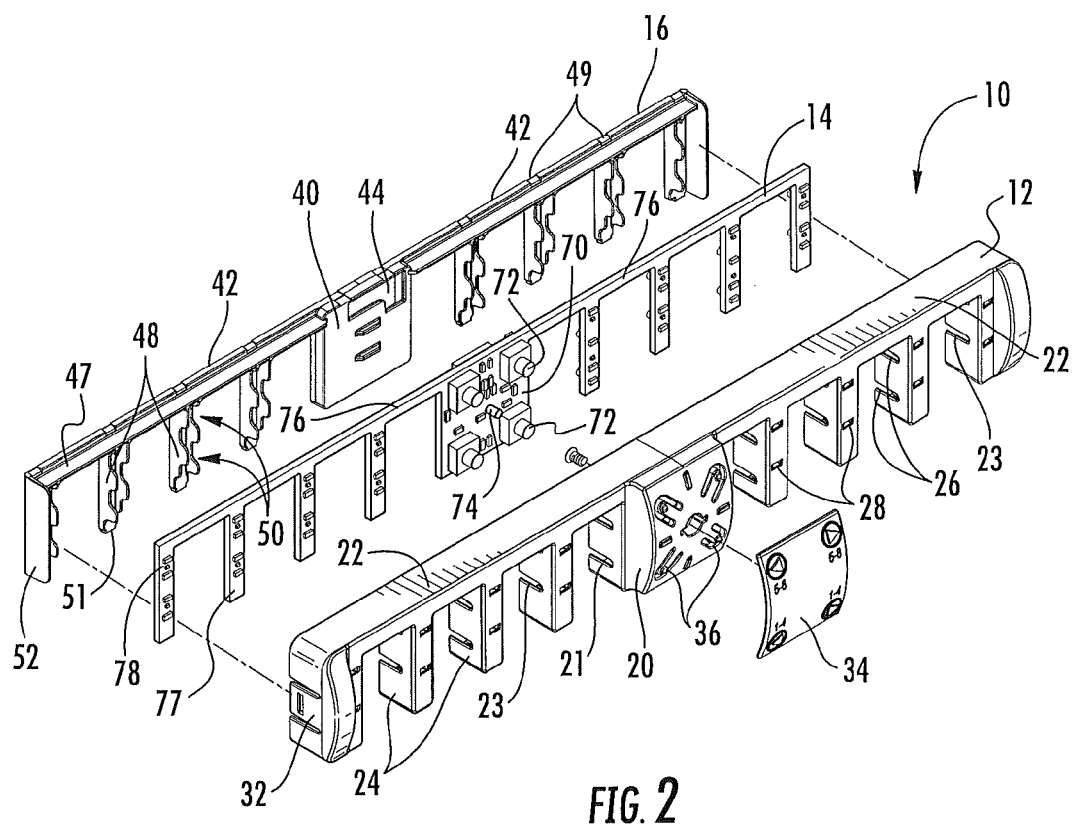
FIG. 2 is an exploded front perspective view of the kit of FIG. 1.
Figure 3:
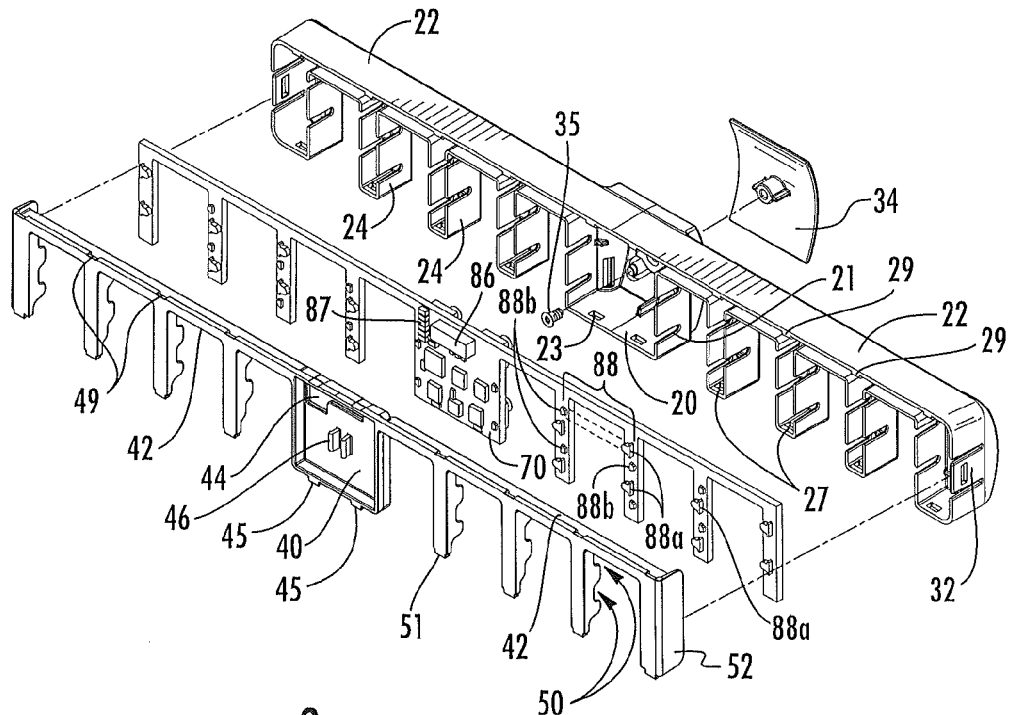
FIG. 3 is an exploded rear perspective view of the kit of FIG. 2.

Referring now to the drawings, an intelligent patch panel kit 10 is illustrated in assembled form in FIG. 1 and in exploded form in FIGS. 2 and 3. The kit 10 includes a housing 12, a PCB 14, and a rear cover 16. These components are described in greater detail below.

Referring to FIGS. 2 and 3, the housing 12 includes a generally square, hollow central portion 20 with upper members 22 extending in opposite directions therefrom. The central portion 20 includes two open-ended slots 21 in each of its side walls, and two slots 23 in the lower wall. A keypad 34 is centrally attached to the central portion 20 via a screw 35; the central portion 20 has four key beams 36 that extend toward the corners of the central portion 20 and can flex rearwardly in response to pressure on the corner of the keypad 34.

The upper members 22 are generally U-shaped in profile, and have nubs 29 that project downwardly. Four fingers 24 extend downwardly from each of the upper members 22. The fingers 24 are generally U-shaped in profile and include holes 28 in their forward walls. Two open-ended slots 26 are present on each "arm" of the "U" defined by each finger 24, and each finger 24 includes a slot 27 in its lower wall. The endmost fingers 24 are somewhat wider than the other fingers 24; each endmost finger 24 includes a latch 32 in its lateral side wall.

The housing 12 may be formed of any material, but is typically formed of an electrically insulating material such as a polymeric material. Exemplary polymeric materials include acrylonitrile-butadiene-styrene (ABS), polystyrene, and polycarbonate, any of which may be formed into the housing 12 via injection molding.

Referring still to FIGS. 2 and 3, the rear cover 16 is configured to generally mimic the shape of the housing 12. As such, the rear cover 16 includes a central body 40 and upper members 42 extending in opposite directions therefrom. The central body 40 includes a cutout area 44 in an upper corner. Latches 46 extend rearwardly from the central body 40. Also, nubs 45 extend downwardly from the lower wall of the central body 40. A rib 47 extends forwardly for most of the length of each upper member 42. Recesses 49 are present in the upper wall of the upper member 40.

Four fingers 48 having generally U-shaped profiles extend downwardly from each upper member 42 in locations that correspond to the fingers 24 of the housing 12. Open-ended recesses 50 are present in the forward edges of the fingers 48. Each of the endmost fingers 48 includes an end wall 52. Nubs 51 extend downwardly from the lower ends of the fingers 48.

Like the housing 12, the rear cover 16 may be formed of any material, but is typically formed of an electrically insulating material such as a polymeric material. Exemplary polymeric materials include acrylonitrile-butadiene-styrene (ABS), polystyrene, and polycarbonate, any of which may be formed into the rear cover 16 via injection molding.

Referring still to FIGS. 2 and 3, the PCB 14 includes a generally square central section 70. A keypad post 74 extends forwardly from the middle of the central section 70, and four keypad buttons 72 extend forwardly from the corners of the central section 70. Upper members 76 extend from both sides of the central section 70, and four fingers 77 extend downwardly from each upper member 76. The fingers 77 include two light-emitting diodes (LEDs) 78 at locations corresponding to the holes 28 of the fingers 24 of the housing 12. The PCB 14 also includes two connectors 86, 87 that extend rearwardly from the central section 70.

Sensors 88 are also mounted on the rear surfaces of the fingers 76. The sensors 88 are configured to detect the presence and/or absence of an adjacent object, such as an MPO connector or other patch cord connector. Such sensors may operate on a reflective principle, in which the adjacent object reflects signals emitted by the sensor, or may operate on a blocking principle, in which the sensor detects signals emitted by an adjacent transmitter unless an adjacent object blocks such signals. Either variety of sensor may be employed with the kit 10, although in some embodiments space constraints may cause blocking-type sensors to be particularly suitable. In the illustrated embodiment, each of the sensors 88 comprises a light 88a mounted to one of the fingers 77 and directed toward a detector 88b mounted on an adjacent finger 77 (the detection path between the light 88a and the detector 88b is shown in broken line in FIG. 3). Two lights 88a are mounted on each finger 77, and lights 88a on adjacent fingers 77 are arranged in a staggered fashion. The presence of an object, such as a fiber optic connector, positioned in the path between a light 88a and its corresponding detector 88b blocks the light from the light 88a, thereby preventing the detector 88b from receiving light and indicating to the kit the presence of the object.

The PCB 14 includes electronic circuitry that can provide intelligence capability to a patch panel. More specifically, the circuitry can determine whether a port on a patch panel is filled with a connector, and in some embodiments can assist with tracking connections to facilitate installation, monitoring and modification of connection schemes for a patch panel, rack, cabinet, network, or the like. Exemplary circuitry and/or software for such capability is described, for example, in U.S. Patent Publication No. 2010/0109892, supra.

Referring now to FIGS. 1-3, the assembly of the kit 10 is illustrated. If they are provided as separate components, the keypad 34 is attached to the remainder of the housing 12 via the screw 35. The PCB 14 is then inserted into the housing 12, with the upper members 76 of the PCB 14 fitting within the upper members 22 of the housing 12, and the fingers 77 of the PCB 14 fitting within the fingers 24 of the housing 12. The holes 28 in the fingers 24 of the housing 12 align with the LEDs 78 on the fingers 77 of the PCB 14. As such, the LEDs 78 are visible through the holes 28 and can signal information about ports on an attached patch panel or the like.

The rear cover 16 is then attached (in this embodiment, snapped) to the housing 12. The nubs 51 of the fingers 48 of the rear cover 16 fit within the slots 27 of the fingers 24 of the housing 12, and the nubs 45 fit within the slots 23 of the central portion 20 of the housing 12. The rear cover 16 can then be pivoted upwardly until its upper members 42 reach the upper members 22 of the housing 12. The nubs 29 of the upper members 22 are received in the recesses 49 of the rear cover 16. The interactions of all of these structures secure the rear cover 16 to the housing 12 with the PCB 14 inside.

When the cover 16 is assembled to the housing 12, the connectors 86, 87 extend rearwardly through the cutout area 44 of the central body 40 of the rear cover 16. The lights 88a and detectors 88b of the sensors 88 are aligned with the open-ended slots 26 of the fingers 24 of the housing 12 and the recesses 50 in the fingers 48 of the rear cover 16, such that each of the sensors 88 is positioned to detect the presence/absence of an object, such as a fiber optic connector, positioned between the fingers 77. In the illustrated embodiment, two sensors 88 (i.e., two lights 88a and two detectors 88b) are mounted between each pair of adjacent fingers 77, such that two separate connectors can be detected; in other words, two "ports" exist between each pair of adjacent fingers 77, and each of the two sensors 88 mounted on those fingers can detect a connector disposed in one of the two ports.

Also, the components of the assembly are arranged so that the key beams 36 of the keypad 34 are aligned with the keypad buttons 72 on the PCB 14. Accordingly, depression of one of the corners of the keypad 34 (which can pivot slightly on the keypad post 74) can enable an operator to access and manipulate information regarding specific ports or connectors mounted therein via the electronic circuitry. Notably, the single keypad 34 is associated with all of the ports monitored by the kit 10; in the illustrated embodiment, each corner of the keypad 34 is associated with each of the LEDs 78 of one row on one side of the keypad 34 (i.e., four ports for each corner button), although other arrangements may also be suitable for use with the kit 10. Typically, repeated depression of one of the corner buttons will illuminate the LEDs 78 of a row serially.

It should also be noted that, in the illustrated configuration, the PCB 14 is protected by from static electricity by the plastic housing 12 and rear cover 16, while still providing access for both sensing by the sensors 88 and visual display of the LEDs 78.

Figure 4A:
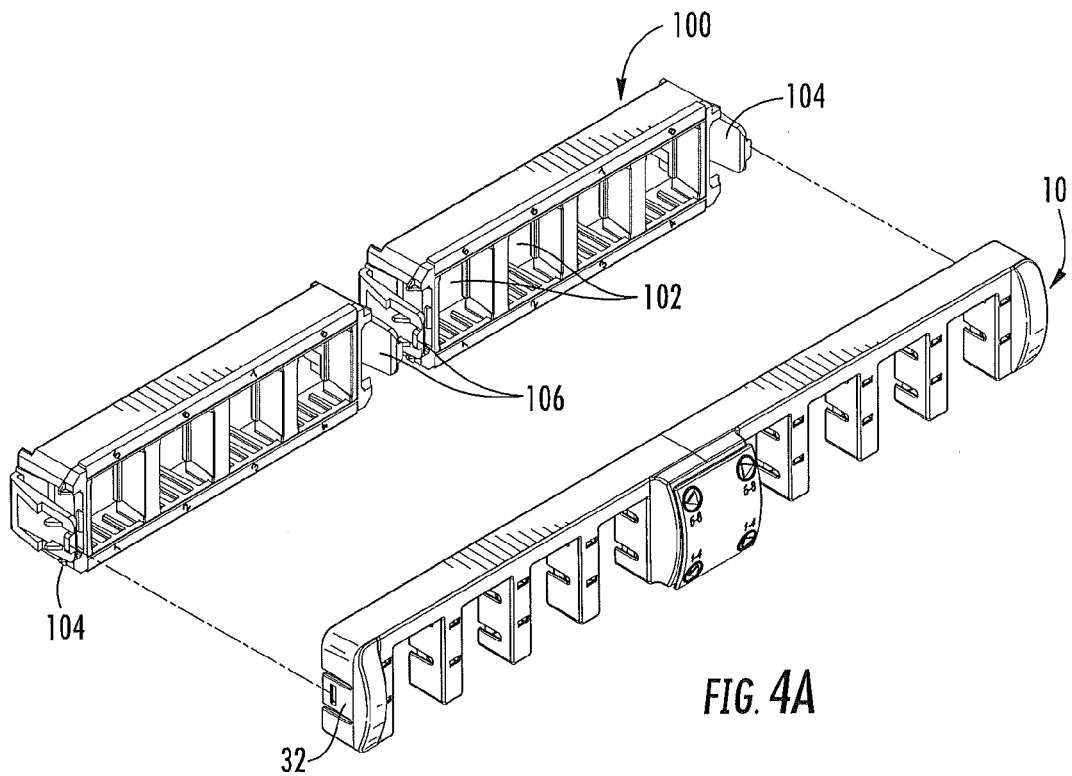
FIG. 4A is an exploded front perspective view of the kit of FIG. 1 and a bezel to be mounted on a patch panel or shelf.
Figure 4B:
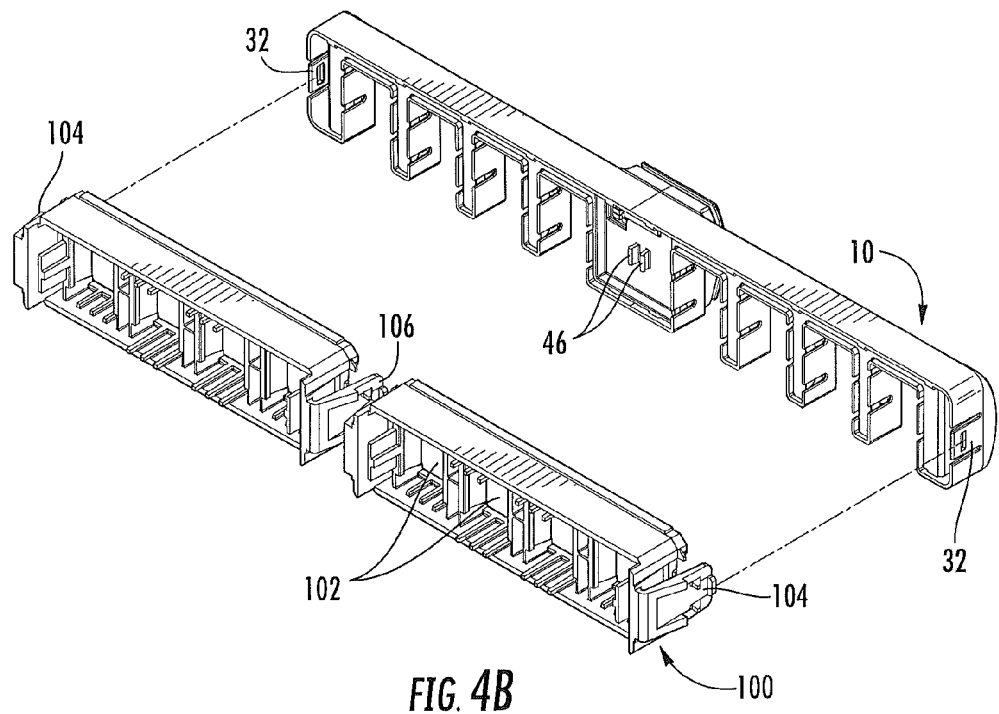
FIG. 4B is an exploded rear perspective view of the kit and bezel of FIG. 4A.
Figure 4C:
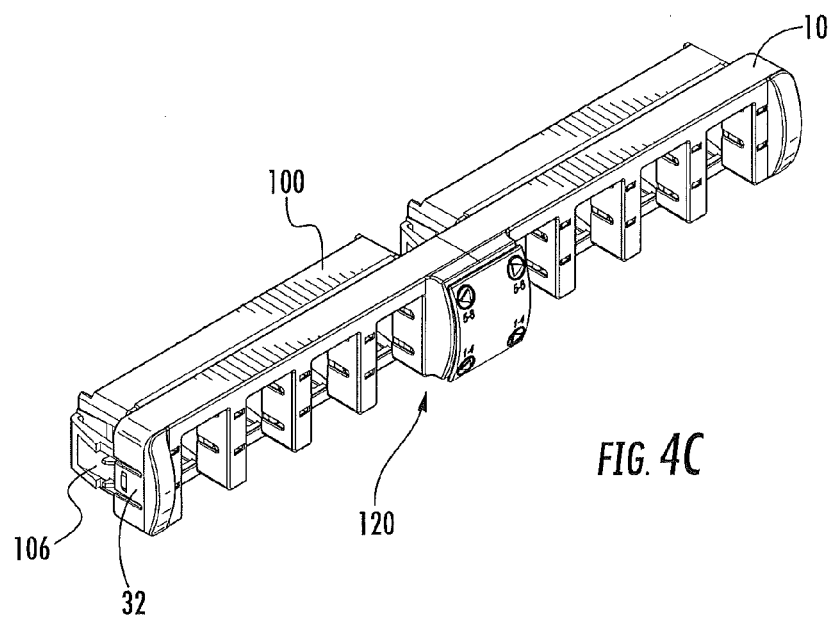
FIG. 4C is an assembled front perspective view of the kit and bezel of FIG. 4A.

The assembled kit 10 can be attached to a patch panel or the like to provide intelligence capability. As is shown in FIGS. 4A-4C, the assembled kit 10 can be attached to a bezel 100 that is configured to mount to a patch panel or shelf. The bezel 100 includes windows 102 that align with the spaces between the fingers of the kit 10; communications connectors can be mounted in the windows 102. At each end, the bezel 100 includes a latch 104 that engages the latches 32 of the housing 12. Also, toward its center the bezel 100 includes two latches 106 that engage the latches 46 of the rear cover 16. The kit-bezel assembly 120 can then be mounted onto a shelf or patch panel.

Figure 5:
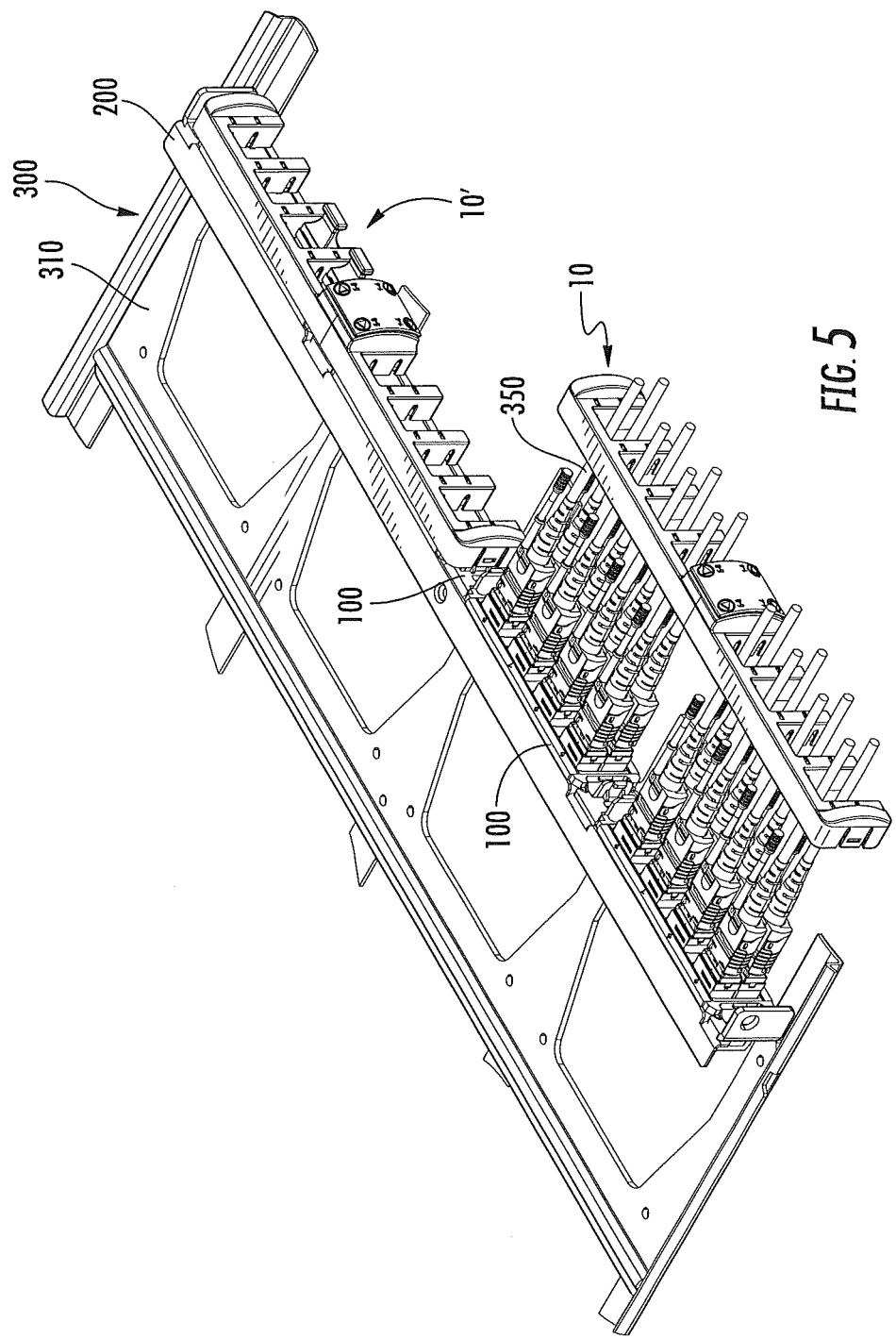
FIG. 5 is a front perspective view of two kits of FIG. 1, one of which is mounted assembled on a patch panel via the bezel of FIGS. 4A-4C and the other of which is in position for mounting onto the patch panel via a bezel, wherein patch cords are connected to connectors mounted in the patch panel.
Figure 6:
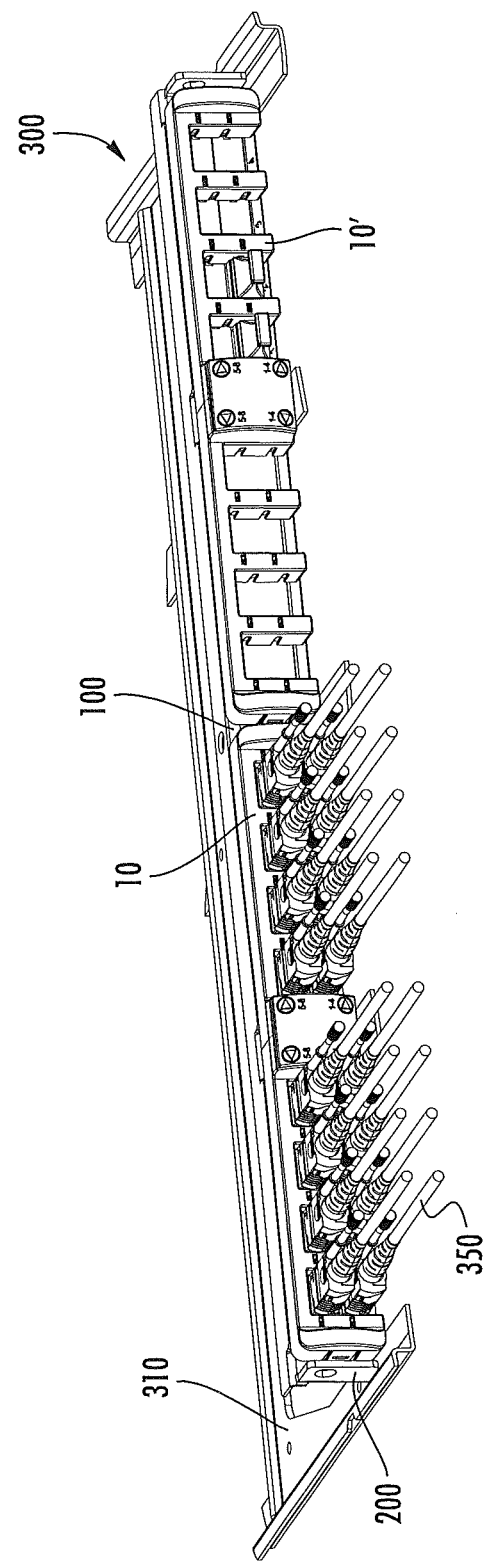
FIG. 6 is a front perspective view of the patch panel and kits of FIG. 4, with patch cords inserted into the ports of one kit.

FIGS. 5 and 6 illustrate an assembly 300 that includes a patch panel 200 and two assembled kits 10, 10' mounted thereon. In FIG. 5, one kit 10' is mounted onto the patch panel 200 via a first bezel 100, and one kit 10 is shown in position for mounting onto the patch panel 200 via a second bezel 100. Patch cords 350 (e.g., fiber optic patch cords) are illustrated as being connected to connectors that define communications ports mounted in the bezel 100. In FIG. 6 both kits 10, 10' are shown mounted onto the patch panel 200. The assembly also includes a shelf 310 (e.g., a 1U shelf) on which the patch panel 200 is mounted (as used herein, a "communications frame" is intended to encompass a patch panel, a shelf, a bezel, or other structure to which the kit can be mounted for use). An exemplary shelf is the SYSTIMAX 360 G2-1U LC shelf, available from CommScope, Inc., Hickory, N.C. FIG. 7 further illustrates cords or cables 370 connected to the opposite sides of the connectors mounted in the patch panel 200. The connectors 86, 87 that extend through the cutout area 44 of the central body 40 of the rear cover 16 can be connected to a controller (not shown) that tracks the connectivity of cords and cables inserted into connectors mounted in the bezel 100.

The kit 10 may be included as part of a shelf during manufacture and initial installation, or it may be added to a non-intelligent shelf or patch panel to provide intelligence capability thereto.

Those of skill in this art will appreciate that the kit 10 may take other forms. For example, although four fingers are shown on each side of the kit 10, thereby defining a total of eight ports on each side, more or fewer fingers may be employed, and/or more or fewer than two ports may be present between each adjacent pair of fingers. Also, although the fingers are shown extending downwardly from the upper members, they may extend upwardly in some embodiments. Further, different sensor configurations than the light-detector combination shown herein may be employed. Other variations may be apparent to those of skill in this art.

In addition, the configuration of the keypad 34 may vary. For example, a "joystick"-style device attached to the keypad 34 may be employed instead of the "corner button" configuration shown therein. Alternatively, a capacitive touchpad or touch screen may be substituted for the keypad. Other variations may also be employed. Moreover, the keypad 34 may include an additional button or other input mechanism that allows the keypad to affirm a particular port or action or to permit additional actions.

Moreover, although the kit 10 is shown employed with optical fiber cables and connectors, the kit 10 may be used with copper communications cables and cords also.

In the drawings and specification, there have been disclosed typical embodiments of the invention and, although specific terms are employed, they are used in a generic and descriptive sense only and not for purposes of limitation, the scope of the invention being set forth in the following claims.

That which is claimed is:

1. A kit for providing intelligence capability to a communications frame, comprising:
   a housing having a central portion, a pair of upper members extending from opposite sides of the central portion, and a plurality of fingers extending away from each of the upper members;
   a rear cover attached to the housing, the cover having a central body, a pair of upper members extending from opposite sides of the central body, and a plurality of fingers extending away from each of the upper members; and
   a PCB having a central section, a pair of upper members extending from opposite sides of the central section, and a plurality of fingers extending away from each of the upper members, the PCB being adapted for attachment to the housing and rear cover, with the central section being sandwiched between the central portion and the central body, the PCB upper members being sandwiched between the rear cover upper members and the housing upper members, and the PCB fingers being sandwiched between the rear cover fingers and the housing fingers; the PCB further comprising electronic circuitry configured to detect the presence or absence of a connector positioned between adjacent PCB fingers.

2. The kit defined in claim 1, adapted to attach to a 1U communications frame.

3. The kit defined in claim 1, wherein the housing includes latches adapted to mount the kit to a communications frame.

4. The kit defined in claim 1, wherein the rear cover snaps onto the housing.

5. The kit defined in claim 1, wherein the electronic circuitry of the PCB includes LEDs for indicating a port of a communications frame.

6. The kit defined in claim 5, wherein the housing includes holes corresponding to the LEDs of the PCB to enable visual access to the LEDs.

7. The kit defined in claim 1, wherein the housing further comprises a keypad configured to input signals to the electronic circuitry.

8. The kit defined in claim 1, wherein the electronic circuitry includes a plurality of sensors for detecting the presence or absence of a connector positioned between adjacent PCB fingers, each of the sensors comprising a light mounted on one PCB finger and a detector for detecting light mounted to an adjacent PCB finger.

9. A communications assembly, comprising:
   a communications frame; and
   an intelligent patching assembly mounted to the communications frame, comprising:
      a housing having a central portion, a pair of upper members extending from opposite sides of the central portion, and a plurality of fingers extending away from each of the upper members;
      a rear cover attached to the housing, the cover having a central body, a pair of upper members extending from opposite sides of the central body, and a plurality of fingers extending away from each of the upper members; and
      a PCB having a central section, a pair of upper members extending from opposite sides of the central section, and a plurality of fingers extending away from each of the upper members, the PCB being adapted for attachment to the housing and rear cover, with the central section being sandwiched between the central portion and the central body, the PCB upper members being sandwiched between the rear cover upper members and the housing upper members, and the PCB fingers being sandwiched between the rear cover fingers and the housing fingers;
      the PCB further comprising electronic circuitry configured to detect the presence or absence of a connector positioned between adjacent PCB fingers.

10. The assembly defined in claim 9, further comprising communications ports mounted in the communications frame.

11. The assembly defined in claim 10, wherein the communications ports are configured to receive optical fibers.

12. The assembly defined in claim 9, wherein the housing includes latches that mount the intelligent patching assembly to the communications frame.

13. The assembly defined in claim 9, wherein the rear cover snaps onto the housing.

14. The assembly defined in claim 9, wherein the electronic circuitry of the PCB includes LEDs for indicating a communications frame port.

15. The assembly defined in claim 14, wherein the housing includes holes corresponding to the LEDs of the PCB to enable visual access to the LEDs.

16. The assembly defined in claim 9, wherein the housing further comprises a keypad configured to input signals to the electronic circuitry.

17. The assembly defined in claim 9, wherein the electronic circuitry includes a plurality of sensors for detecting the presence or absence of a connector positioned between adjacent PCB fingers, each of the sensors comprising a light mounted on one PCB finger and a detector for detecting light mounted to an adjacent PCB finger.

18. The assembly defined in claim 9, further comprising fiber optic cords connected to connectors mounted to the communications frame.

* * * * *